E. R., W. H. & O. A. KLITZKE.
POTATO HARVESTER.
APPLICATION FILED FEB. 24, 1916.
1,202,737.
Patented Oct. 24, 1916.
3 SHEETS—SHEET 1.
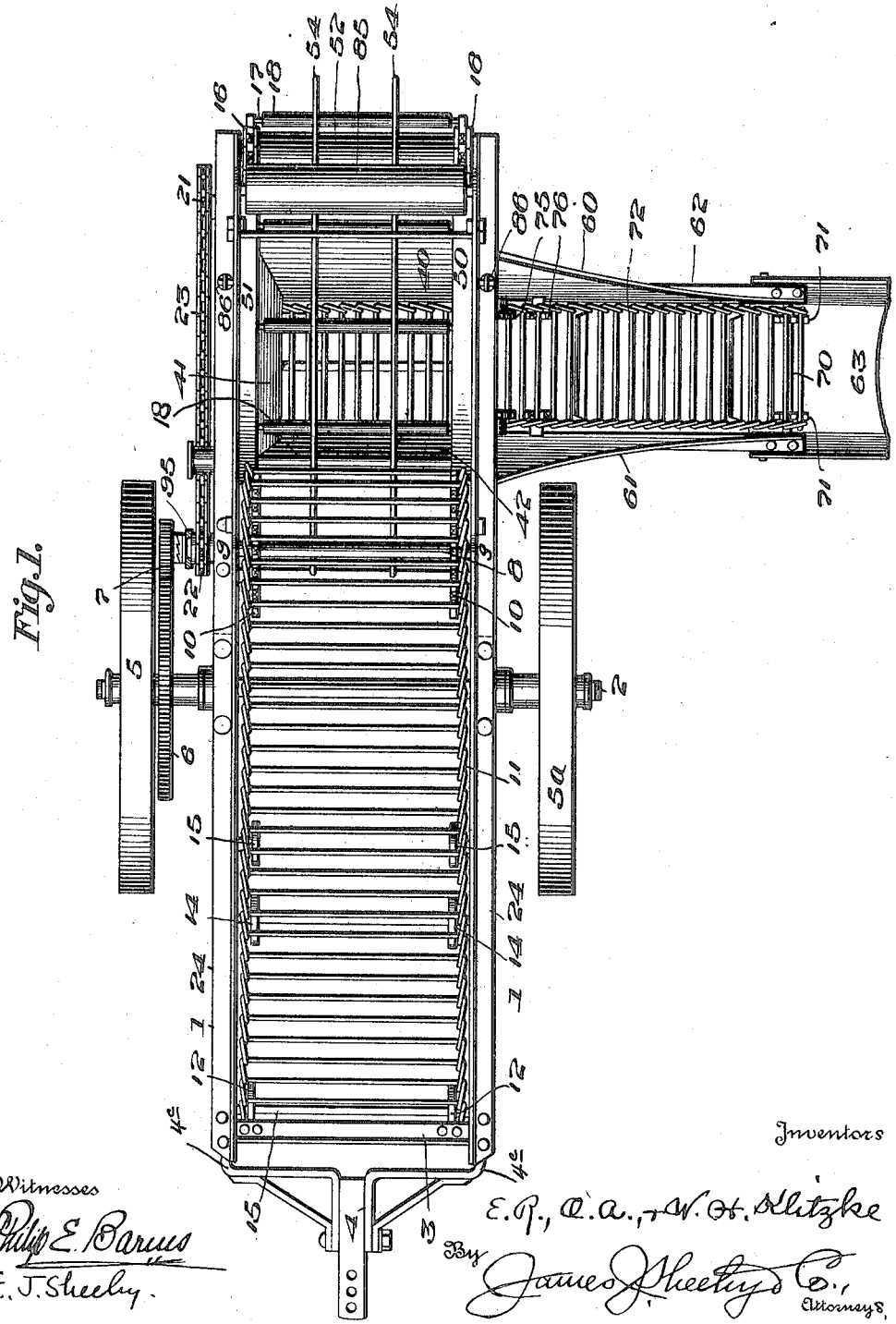

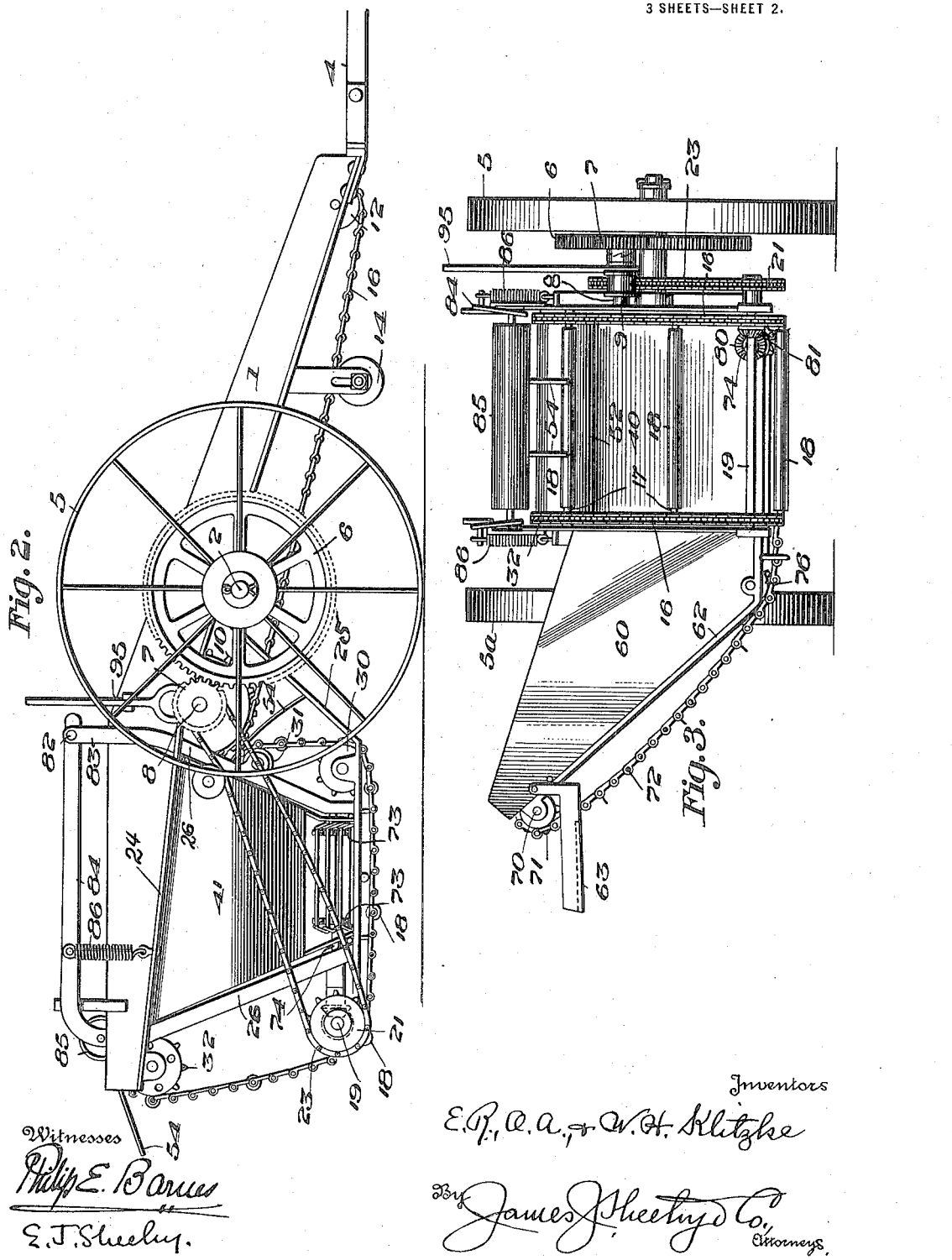

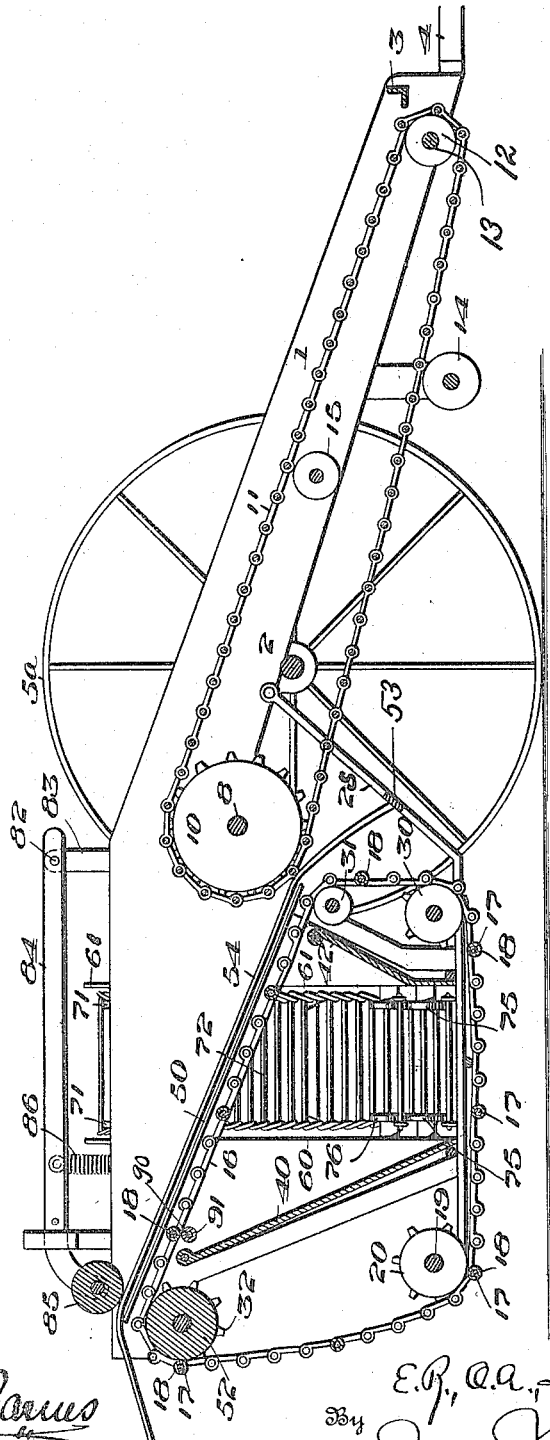

UNITED STATES PATENT OFFICE.

EMIL R. KLITZKE, WILHELM H. KLITZKE, AND OTTO A. KLITZKE, OF REEDSBURG, WISCONSIN.

POTATO-HARVESTER.

1,202,737.  Specification of Letters Patent.  Patented Oct. 24, 1916.

Application filed February 24, 1916. Serial No. 80,200.

*To all whom it may concern:*

Be it known that we, EMIL R. KLITZKE, WILHELM H. KLITZKE, and OTTO A. KLITZKE, citizens of the United States, residing at Reedsburg, in the county of Sauk and State of Wisconsin, have invented new and useful Improvements in Potato-Harvesters, of which the following is a specification.

Our present invention pertains to potato harvesters; and it consists in the peculiar and advantageous apparatus, hereinafter described and claimed, designed to be attached to and receive potatoes from a potato digger, and constructed with a view to efficiently freeing the potatoes from dirt and vines, and delivering the potatoes laterally to a wagon or other receptacle located to receive the same, and, at the same time, discharging the vines to the ground.

In the accompanying drawings which are hereby made a part hereof: Figure 1 is a top plan view of the apparatus constituting the best practical embodiment of our invention that we have as yet devised. Fig. 2 is an elevation of the right-hand side of the apparatus. Fig. 3 is a rear elevation of the same. Fig. 4 is a longitudinal vertical section.

Similar numerals of reference designate corresponding parts in all of the views of the drawings.

The main frame of our novel apparatus comprises spaced longitudinal walls 1 mounted on an axle 2, and having forward downwardly-inclined portions and rear horizontally-disposed portions, as illustrated. At their forward ends the said frame walls 1 are connected together by a cross bar 3, and are equipped with a draft bar 4 through the medium of which the improved apparatus may be connected in conventional manner with a potato digger at the rear thereof.

Ground wheels 5 5ª are loosely mounted on the axle 2, and to the wheel 5 is fixed a spur gear 6. The spur gear is intermeshed with a complementary spur gear 7 loose on a transverse shaft 8, journaled on bearings 9 on the frame walls 1. Fixed on said shaft 8 are sprocket gears 10, and mounted on said sprocket gears and designed to be driven by the same is an endless, upwardly and rearwardly inclined, conveyer 11, having spaced transverse rods as shown. The said conveyer is also mounted on idler wheels 12 carried by a shaft 13 arranged in the forward portion of the frame walls 1, and its upper and lower stretches are supported by idler wheels 15 and 14, respectively; the said wheels 14 and 15 being carried by the frame walls 1, and being designed to prevent sagging of the upper and lower stretches of the conveyer.

In the practical use of the apparatus, potatoes, dirt and vines are delivered from the rear end of a potato digger to the lower portion of the upper stretch of conveyer 11 and are carried by said stretch upwardly and rearwardly. Incidental to the said passage of the potatoes, etc., a large portion of the dirt is freed from the potatoes and drops through the interstices of the conveyer 11 to the ground. From the rear, uppermost portion of said conveyer 11 the potatoes, vines, etc., are discharged to a longitudinally-traveling conveyer made up of sprocket belts 16, cross rods 17 spaced a considerable distance apart, and small rollers 18 loosely mounted on said cross rods. The belts 16 of the said vine conveyer are driven by a transverse shaft 19 on which are sprocket gears 20 engaged with the belts. The shaft 19 is also equipped with a sprocket gear 21, and is driven from a sprocket gear 22 on the shaft 8 through a sprocket belt 23.

Arranged alongside the frame walls 1 and fixed thereto are auxiliary frame bars 24 with which the before-mentioned draft bar 4 is connected, and fixed to said bars 24 are depending frame bars 25, the rear end portions of which are connected with the rear portions of the frame walls 1 and frame bars 24 by hangers 26. The shaft 19 is journaled in suitable bearings on the rear portions of the frame bars 25, and is located at the lower portion of the rear end of the apparatus.

In addition to the sprocket gears 20 on the shaft 19, the sprocket belts 16 of the vine conveyers pass around idler sprocket gears 30 mounted on the frame bars 25, idler sprocket gears 31 located above the gears 30, and idler sprocket gears 32 located at the upper portion of the rear end of the apparatus. In this connection it will be noted that the upper stretch of the vine conveyer, which travels rearwardly, extends upwardly and rearwardly in a hopper formed by a back wall 40, a side wall 41 and a front wall 42; said walls 40, 41 and 42 being suitably connected in fixed manner with the frame. It will also be noted that the said upper stretch of the vine conveyer is arranged and adapted to move under flanges 50, 51, fixed to the side wall 41 and the opposite frame wall 1, respectively.

Mounted between and adapted to turn with one of two idler gears 32 is a roller 52, and connected to a cross bar 53 interposed between and fixed to the frame bars 25 are parallel rods 54. These rods 54 extend rearwardly and upwardly over the upper stretch of the vine conveyer and also over the said roller 52, and terminate at the rear end of the apparatus in downwardly and rearwardly inclined portions which extend beyond the roller 52, as illustrated.

Fixed to and forming a continuation of the back wall 40 of the hopper is a laterally-extending wall 60, and arranged in front of and spaced from said wall 60 is a wall 61 which is fixed to and forms a continuation of the front hopper wall 42. The said walls 60 and 61 are reinforced by a lateral sub-frame 62 which is fixed with respect to the frame bars 25.

Pivoted to the upper portions of the spaced walls 60, and 61 is a chute 63 which is adapted to discharge potatoes to a wagon body or other receptacle moved alongside the apparatus.

Mounted in the walls 61 and 62 adjacent to the upper ends thereof is a longitudinally-disposed shaft 70 on which are sprocket gears 71, and passed around and engaging the said sprocket gears is a transverse potato-conveyer 72 of the endless type, the bars of which are preferably flat to better carry the potatoes. The said conveyer 72 also passes around sprocket gears 73 on a longitudinally-disposed drive shaft 74, and it will also be noted that the upper stretch of the potato-conveyer 72 is arranged under idler gears or wheels 75, while the lower stretch of said conveyer is arranged under idler gears 76. By virtue of this arrangement, a portion of the conveyer 72 extends horizontally above the lower stretch of the vine conveyer, while the remainder of the conveyer is inclined upwardly and in a direction away from the adjacent frame-wall 1 of the apparatus so as to afford to the conveyer the capacity of elevating the potatoes to the point where the same are discharged into the chute 63. At its rear end, the drive shaft 74 of the transverse potato-conveyer is provided with a miter-gear 80, and said gear 80 is intermeshed with a miter-gear 81 fixed on the shaft 19, whereby, as will be readily manifest, the shaft 74 will be driven from the shaft 19.

Pivotally-connected at 82 to uprights 83 rising from the frame walls 1, are rearwardly extending-vertically-swinging arms 84 which constitute a frame for a pressure roller 85, disposed above the rods 54 and the roller 52. Interposed between and connected to the said arms 84 and the frame walls are retractile-springs 86, which have for their purpose to yieldingly press the roller 85 downwardly on the said rods 54 and roller 52.

Extending between the frame walls 1, at a point immediately in rear of the roller 52 and immediately below the upper stretch of the vine-conveyer, is a transverse rod 90, and mounted on the said rod 90 is a roller 91 which serves an important purpose in the separation of the potatoes from the vines as will appear from the following.

During the operation of the apparatus, potatoes and vines are delivered from the rear portion of the conveyer 11 to the upper stretch of the vine conveyer, and a large proportion of the potatoes drop through the interstices of the vine conveyer and fall upon the upper stretch of the transverse conveyer by which they are carried upwardly and laterally and delivered to a wagon body or the like. Such potatoes as remain on the vines hang in pendent position from the upper stretch of the vine conveyer and consequently when the vines are carried over the roller 91 and under the pressure roller 85, the potatoes will be stripped from the vines, and the potatoes will drop downwardly in the hopper to the transverse conveyer while the vines will be moved by the roller 52 to the rear end of and discharged from the machine. It will also be noticed that in the stripping of the potatoes from the vines, the rollers of the vine-conveyer coöperate efficiently with the roller 91; and it will further be noted that while being moved upwardly and rearwardly by the transverse rollers of the vine conveyer, the vines rest on the parallel rods 54 from which the vines are eventually discharged to the ground at a point in rear of the apparatus. The pressure roller 85 by holding the vines down to the vine conveyer assures the positive rearward movement of the vines by the conveyer and in that way contributes materially to the efficiency of the apparatus and particularly to the stripping capacity of the bar or roller 91. One of the sprocket gears 32 is fast on the shaft that carries the roller 52 and the other sprocket gear 32 is loose on the said shaft. This is advantageous because it lessens the liability of the chain running faster at one side than at the other.

In the preferred embodiment of our invention, the spur gear 7 is loose on shaft 8 and is equipped with a clutch member (Fig. 1) opposed to a complementary clutch member mounted to turn with and slide on said shaft 8. The latter clutch member is connected in the ordinary well-known manner with a hand lever 95 (Figs. 1, 2 and 3) through the medium of which it may be moved into and out of engagement with the clutch member on spur gear 7. By virtue of this provision the working parts of my novel apparatus may be thrown into and out of operation at the will of an attendant. The draft bar 4 is preferably connected with bars 4ª which are arranged alongside of and fixed to the walls 1. When desired the idler wheels 15 may be made oval instead of circular in order to shake the conveyer 11 and loosen the dirt from the potatoes. It is obvious that when deemed expedient the spur gearing shown in Fig. 2 may be covered in order to prevent the potato vines from becoming entangled in the same.

Having described our invention, what we claim and desire to secure by Letters-Patent, is:

1. In an apparatus for the purpose described, the combination of a frame, a hopper carried thereby; an endless vine-conveyer supported in the frame and having spaced transverse bars and also having a rearwardly-traveling upper stretch disposed above said hopper, means for driving said vine-conveyer, means for delivering vines and potatoes to the upper stretch thereof, a transverse bar carried by the frame and arranged under and adjacent to the upper stretch of the vine-conveyer and also arranged adjacent to the rear wall of the hopper, a vertically-movable frame arranged above and hinged at its forward end to the main frame, a roller carried by said vertically-movable frame and arranged above and against the upper stretch of the vine-conveyer at a point in rear of the transverse bar carried by the frame, and retractile springs interposed between the vertically-movable frame and the first-named frame.

2. In an apparatus for the purpose described, the combination of a main frame, a hopper carried thereby, an endless vine-conveyer supported therein and having spaced transverse bars and also having a rearwardly-traveling upper stretch above said hopper, a transverse bar carried by the frame and arranged under and adjacent to the upper stretch of the vine-conveyer and also arranged adjacent to the rear wall of the hopper, a roller mounted in the frame in rear of the hopper and under and in engagement with the vine-conveyer, a vertically-movable frame arranged above and hinged at its forward end to the main frame, a roller carried by said frame and arranged above the upper stretch of the vine-conveyer at a point in rear of said transverse bar and in front of the first-named roller, and retractile springs connecting said frame and the main frame.

3. In an apparatus for the purpose described, the combination of a main frame, a hopper carried thereby, an endless vine-conveyer supported therein and having spaced transverse bars and also having a rearwardly-traveling upper stretch above said hopper, a transverse bar carried by the frame and arranged under and adjacent to the upper stretch of the vine-conveyer and also arranged adjacent to the rear wall of the hopper, a roller mounted in the frame in rear of the hopper and under and in engagement with the vine-conveyer, a vertically-movable frame arranged above and hinged at its forward end to the main frame, a roller carried by said frame and arranged above the upper stretch of the vine-conveyer at a point in rear of the transverse bar and in front of the first-named roller, retractile springs connecting said frame and the main frame, and resilient bars connected at their forward ends with the main frame and extending rearwardly over the upper stretch of the vine-conveyer and between and rearwardly of said rollers.

4. In an apparatus for the purpose described, the combination of a main frame, a hopper therein, an endless vine-conveyer mounted in the main-frame and having spaced transverse bars and also having an upper rearwardly-traveling stretch disposed above said hopper, means for driving said conveyer, means for delivering vines and potatoes thereto, a transverse bar carried by the main frame and arranged under and adjacent to the upper stretch of the vine-conveyer and also adjacent to the rear wall of the hopper, and a spring-pressed roller connected with the main frame and arranged above and against the upper stretch of the vine-conveyer and in the rear of said transverse bar of the frame.

5. In an apparatus for the purpose described, the combination of a main frame, a hopper therein, an endless vine-conveyer mounted in the main frame and having spaced transverse bars and also having a rearwardly-traveling stretch above said hopper, a transverse bar on the main frame and arranged under and adjacent to the upper stretch of the vine-conveyer and also adjacent to the rear wall of the hopper, a roller mounted in the rear portion of the main frame and over which the vine-conveyer passes, a spring-pressed roller connected with the main frame and arranged above the vine-conveyer and in rear of said transverse bar, and resilient bars connected with the main frame and extending rearwardly over the vine-conveyer and between and to the rear of the rollers and free at their rear ends.

In testimony whereof we have hereunto set our hands in presence of two subscribing witnesses.

EMIL R. KLITZKE.
WILHELM H. KLITZKE.
OTTO A. KLITZKE.

Witnesses:
H. GROTOPHORST,
MAUD BATTLES.

Copies of this patent may be obtained for five cents each, by addressing the "Commissioner of Patents, Washington, D. C."